(12) United States Patent
Xu (10) Patent No.: US 7,348,709 B2
(45) Date of Patent: Mar. 25, 2008

(54) HEAVY-LOAD NANOPOSITIONER WITH DUAL-PARALLEL FLEXURE DESIGN

(75) Inventor: Ying Xu, Madison, WI (US)

(73) Assignee: nPoint, Inc., Madison, WI (US)

( * ) Notice: Subject to any disclaimer, the term of this patent is extended or adjusted under 35 U.S.C. 154(b) by 381 days.

(21) Appl. No.: 11/107,008

(22) Filed: Apr. 15, 2005

(65) Prior Publication Data
US 2005/0231075 A1    Oct. 20, 2005

Related U.S. Application Data

(60) Provisional application No. 60/563,077, filed on Apr. 16, 2004.

(51) Int. Cl.
*H01L 41/08* (2006.01)
(52) U.S. Cl. .................................. 310/328
(58) Field of Classification Search ............... 310/328, 310/309, 311, 306; 269/58, 71, 318; 74/490.08, 74/490.01; *H01L 41/08*
See application file for complete search history.

(56) References Cited

U.S. PATENT DOCUMENTS

| | | | | |
|---|---|---|---|---|
| 4,667,415 A | * | 5/1987 | Barsky | 33/568 |
| 5,281,884 A | * | 1/1994 | Basavanhally et al. | 310/328 |
| 5,903,085 A | * | 5/1999 | Karam | 310/328 |
| 6,240,799 B1 | * | 6/2001 | Yau | 74/479.01 |
| 6,467,761 B1 | * | 10/2002 | Amatucci et al. | 269/58 |
| 6,638,625 B1 | | 10/2003 | Draeger | |

* cited by examiner

*Primary Examiner*—Darren Schuberg
*Assistant Examiner*—Karen Addison
(74) *Attorney, Agent, or Firm*—Joseph T. Leone, Esq.; DeWitt Ross & Stevens S.C.

(57) ABSTRACT

A positioning device for heavy loads is provided. The positioning device includes a frame and a stage disposed or integrally defined within the frame. The stage is dimensioned and configured to be translatable within the frame in at least one axis of motion. At least one dual-parallel flexure connects the stage to the frame.

20 Claims, 6 Drawing Sheets

HEAVY-LOAD NANOPOSITIONER WITH DUAL-PARALLEL FLEXURE DESIGN

CROSS-REFERENCE TO RELATED APPLICATIONS

This application claims priority under 35 USC §119(e) to U.S. Provisional Application Ser. No. 60/563,077, filed Apr. 16, 2004, the entirety of which is incorporated herein.

FIELD OF THE INVENTION

The invention relates to a nanopositioner having at least one dual-parallel flexure. The dual-parallel flexure is particularly suitable for use with heavy loads.

BACKGROUND

Nanopositioners are widely used in many research and industrial areas. In many fields, such as semiconductor fabrication and quality control, precision sub-micrometer- and nanometer-scale assembly and positioning is required. For example, in the semiconductor field, there exists a constant need to inspect the wafers rigorously, and even to inspect some of the tools used to produce the wafers (such as advanced photomasks). The profitability of semiconductor fabricators depends in large measure on their ability to produce huge numbers of chips with essentially zero defects. As a consequence, quality control is a primary concern. With the smaller features being created using the most up-to-date technologies, the semiconductor industry, among many others, requires critical dimension (CD) surface metrology that is faster and more accurate than ever. Providing CD metrology in turn requires the ability to move a probe across a surface to be inspected in the X and Y directions, and to be able to move the probe toward and away from that surface in the Z direction rapidly, repeatedly, precisely, and accurately.

Nanopositioners based upon flexure hinge designs provide this type of precise, fine-scale motion in the X, XY, or XYZ directions. Nanopositioners also have been developed for use in precision machining, optical switching, cell physiology research, and other applications. The material currently used in fabricating the vast majority of such nanopositioners is Al 7075 alloy. Other aluminum alloys may be used in instances requiring compatibility with ultrahigh vacuum environments. Nanopositioners requiring extreme positioning precision (at the expense of speed) may be made from materials having a relatively low coefficient of thermal expansion (CTE), such as invar alloys. Nanopositioners made from the current materials provide modest performance. Significant changes in nanopositioner performance, however, will require changes in flexure design, especially where heavy loads are to be borne by the nanopositioner.

In addition to semiconductor manufacturing, nanopositioners are also used in such fields as medicine, biotechnology, and precision electronic manufacturing. For example, in biotechnology, individual cells can be manipulated using nanopositioning stages. While the objects being positioned using a nanopositioner are often minute (having masses ranging from far less than one (1) gram in mass to perhaps tens or hundreds of grams), other objects requiring precision positioning have a mass greater than 1 kilogram. Positioning these more massive, "heavy-load" objects requires a nanopositioner having more strenuous, robust properties. The positioning devices currently available do not provide the required stiffness and range-of-motion required to perform optimally under these heavy-load conditions. Therefore, an unmet need exists for a nanopositioning stage that can accommodate heavy loads (e.g., 1 kilogram in mass or greater) and position them with accuracy, precision and speed.

Figure 1:
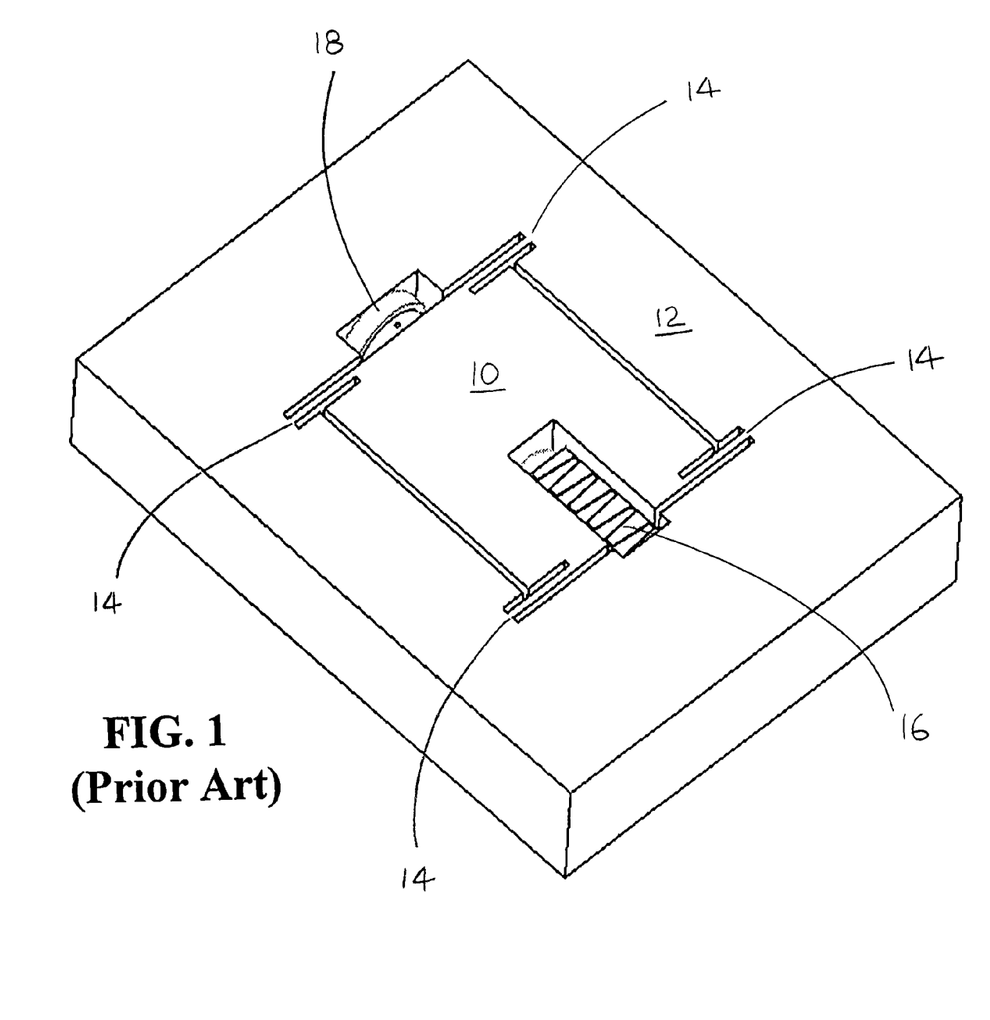
FIG. 1 is a perspective view of a prior art nanopositioner.
Figure 2:
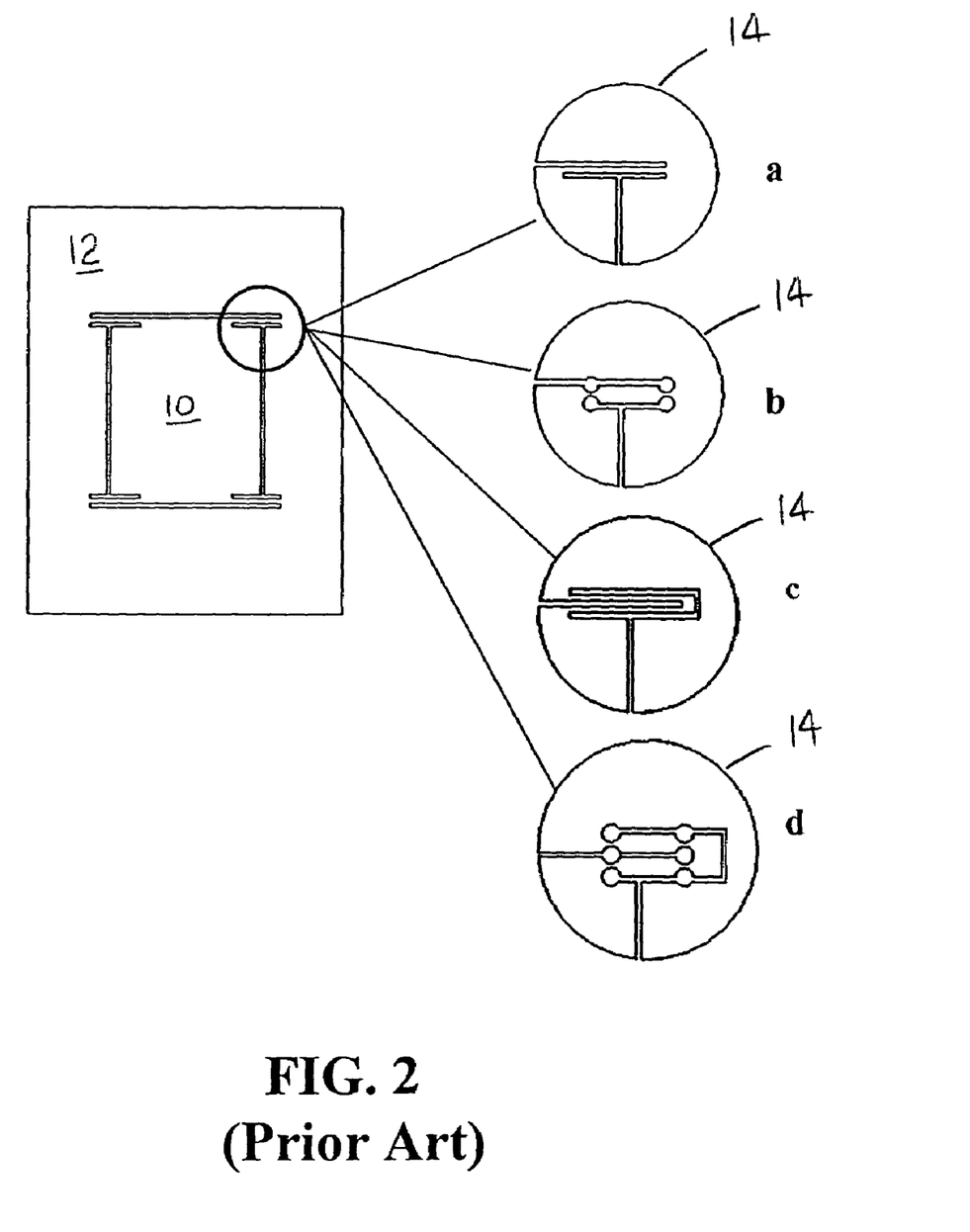
FIG. 2 is a top plan view of the prior art nanopositioner depicted in FIG. 1, and further showing various alternate conventional flexure designs designated by reference characters a, b, c, and d.

As used herein, the term "nanopositioner" denotes a stage movable within fixed limits and degrees of freedom. Referring now to FIGS. 1 and 2, which depict conventional, prior art nanopositioners, a movable stage 10 is fixed within a frame 12 via a plurality of flexural hinges 14 (sometimes referred to herein simply as "flexures"). The flexures function in combination as a motion guidance mechanism, allowing the stage to move in one or more desired directions, while inhibiting motion in all other directions. A complete nanopositioning system also includes an actuator 16 to move the stage, and a sensor 20 to sense the motion and position of the stage. The actuator and sensor are normally operationally linked to a programmable control circuit (not shown) that drives the actuator and interprets the signals generated by the sensor. Often, the actuator 16 is composed of a piezoelectric element. The typical sensor 18 is usually a capacitance sensor. A strain gauge or an inductive sensor can also be used.

To achieve a pure, single-axis motion, the flexures of a nanopositioner must be designed so as to constrain any off-axis movement, while simultaneously providing smooth, unfettered motion in the desired single axis. In short, the entire stage, flexure, actuator, and sensor combination ideally defines an integrated nanopositioning system that transfers motion from the actuator to the stage in a smooth, elastic deflection of flexures that are essentially friction-free in the desired axis of motion, and immobile in all other axes.

In any nanopositioning stage, the resonant frequency of the stage/flexure/frame combination determines the positioning and/or scanning speed, as well as the stability, of the system. To create a nanopositioning stage that can accommodate heavy loads, the stiffness of the stage must be increased to accommodate the increased load. To increase the stiffness of a stage, the flexure guidance mechanism must be changed to provide smooth motion in the desired axis or axes, while limiting motion in the undesired axis or axes.

Conventional flexure designs have a low stiffness in the moving axis to allow smooth freedom of motion. Low stiffness in the moving axis is also important because it allows the actuator to generate the required translation of the stage while using a minimum amount of driving force. This helps to maintain the accuracy and precision of the stage positioning because a high driving force tends to introduce unnecessary deformations in the frame. If the driving force of the actuator induces frame deformation, the ability of the device to accurately and precisely position the stage is degraded. Conventional flexures also have a high stiffness in other axes to guide the motion of the flexure in the desired axis while limiting motion in all other axes. The stiffness of the stage is controlled by the stiffness of the actuator 16 in the axis of translation. In all other directions, the stiffness of the stage is controlled by the flexures 14. Ideally, the vibration mode of the first resonant frequency is along the translation axis, so that the excited vibration can be suppressed with the actuator and the controller. For a normal load stage, the various conventional, single flexure designs can maintain the stiffness in the non-translation axes at a high level, which maintains the resonant frequencies at sufficiently high levels. For a heavy load stage, however, the overall stiffness of the nanopositioner must be significantly increased to maintain the desired resonant frequencies. While the stiffness in the translation axis can be increased by using a stiffer piezo-actuator, the stiffness of the non-translational axes can only be increased by increasing the stiffness of the flexures. Therefore, the design of the flexures becomes an overriding critical concern as the load to be borne by the stage increases.

Figure 2A:
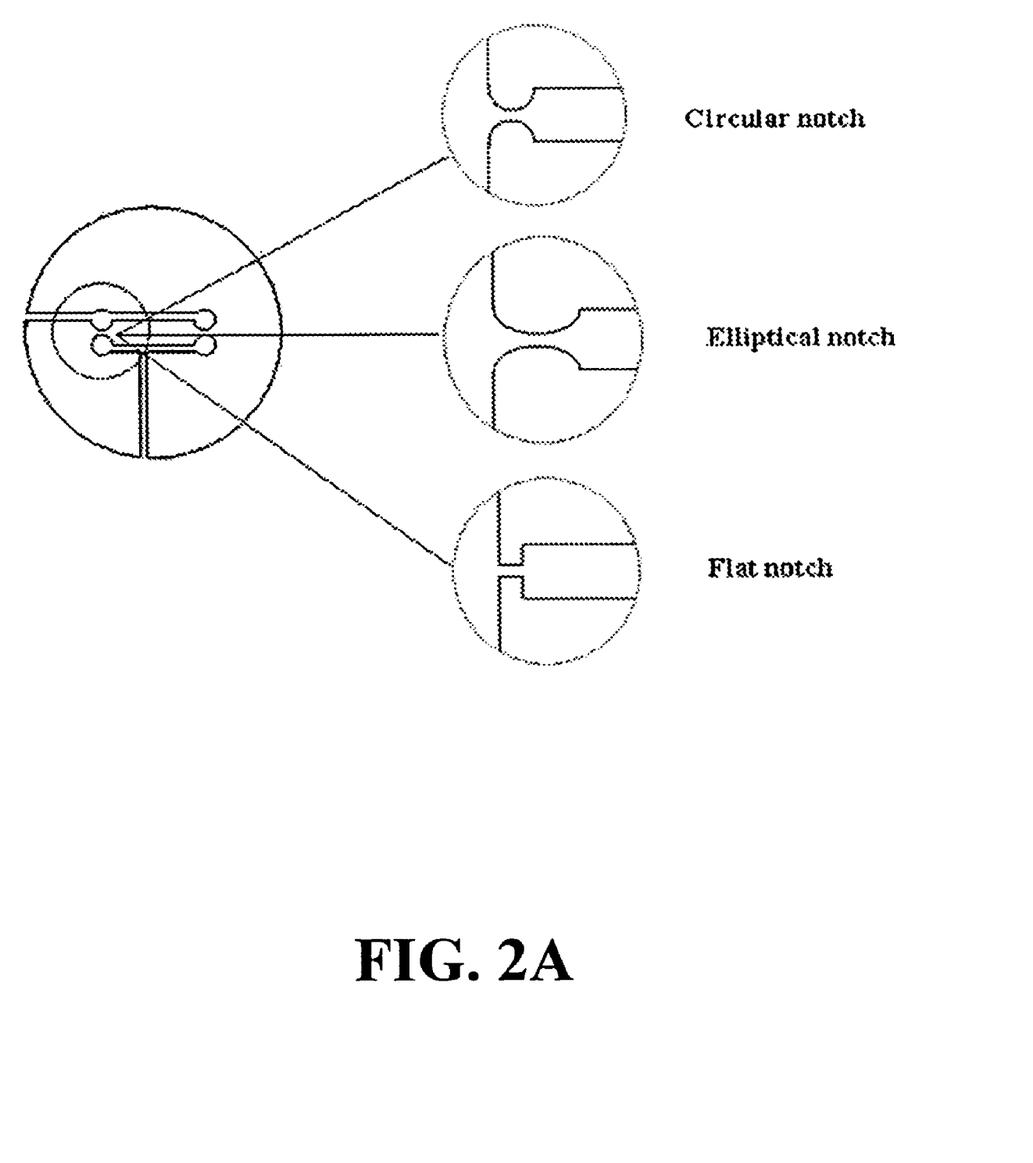
FIG. 2A is a magnified top plan view of various sub-types of conventional notch flexures.

There are four typical flexure designs for single-axis nanopositioning stages. These four conventional, prior art designs are shown in FIGS. 2 and 2A. They are the single leaf-spring flexure (FIG. 2, reference "a"), the single notch flexure (FIG. 2, reference "b"), the compound leaf spring flexure (FIG. 2, reference "c") and the compound notch flexure (FIG. 2, reference "d"). All of these designs have been successfully incorporated into nanopositioners that can be purchased in the commercial markets. The notch flexure can also be expanded to different sub-types of notch flexures depending on the geometric features of the notches, such as a circular notch flexure, an elliptical notch flexure, a flat notch flexure, and the like, as shown in FIG. 2A. While the conventional flexure designs depicted in FIGS. 2 and 2A yield nominally acceptable results for small objects, they cannot function to position kilogram-weight objects precisely and rapidly.

SUMMARY OF THE INVENTION

A first embodiment of the invention is directed to a positioning device that comprises a frame and a stage disposed or integrally defined within the frame. The stage is dimensioned and configured to be translatable within the frame in at least one axis of motion. At least one dual-parallel flexure attaches the stage to the frame.

In the preferred embodiment, at least one actuator is operationally linked to the frame and the stage. The actuator is dimensioned and configured to translate the stage within the at least one axis of motion. Preferably, the actuator is a piezoelectric actuator. More than one actuator may be used to move the stage within the frame. The device may also optionally comprise at least one sensor operationally linked to the frame and the stage. The sensor is dimensioned and configured to measure the position and/or the speed of the stage relative to the frame. In the preferred embodiment, the stage is substantially rectangular, and includes four dual-parallel flexures (a dual-parallel flexure disposed at each corner of the stage).

A second embodiment of the invention is directed to a positioning device as described previously, the device comprising a frame and an integral stage defined within the frame. The stage is dimensioned and configured to be translatable within the frame in at least one axis of motion. The second embodiment further includes at least one dual-parallel flexure connecting the stage to the frame and at least one actuator operationally linked to the frame and the stage. Lastly, a sensor is included to measure the location and/or the speed of the stage relative to the frame. Any type of sensor now known or developed in the future which is capable of measuring the motion and/or position of the stage relative to the frame can be used.

A third embodiment of the invention is directed to a positioning device comprising a frame and a substantially rectangular, integral stage defined within the frame. The stage is dimensioned and configured to be translatable within the frame in at least one axis of motion. In this embodiment, four dual-parallel flexures connect the stage to the frame, with a dual-parallel flexure being disposed at each corner of the stage. At least one piezoelectric actuator is operationally linked to the frame and the stage, and the actuator is dimensioned and configured to translate the stage within the at least one axis of motion. Lastly, a sensor is provided to measure the location and/or motion of the stage within the frame.

The positioning device disclosed herein is capable of positioning loads of 1 kg or greater to nanometer-scale accuracy and precision.

DETAILED DESCRIPTION OF THE INVENTION

As noted earlier, while the conventional flexure designs depicted in FIG. 2 yield nominally acceptable results for small objects, they cannot function to position kilogram-weight objects accurately, precisely, and rapidly. These conventional flexure designs simply lack the required stiffness to function in high-load environments. To succeed in heavy-load uses, the flexure stiffness must be increased dramatically.

To increase flexure stiffness, the length, depth and thickness of the flexure must be optimized. However, the overall dimensions of the flexure are inescapably limited by the overall dimensions of the monolithic platform from which the stage is machined. Thus, dimensions of the flexure can be manipulated only to a certain point (after which the overall dimensions of the device become too large or the device becomes structurally unstable as the dimensions of the flexure approach the size of the platform itself). Once the maximum allowable stress of the flexure is determined, the stiffness of the flexure is limited to that range. However, a dual-parallel flexure mechanism, as shown in FIG. 3, reference number 20, can further increase the stiffness of the flexure mechanism without adversely affecting the other desirable characteristics of the stage.

Figure 3:
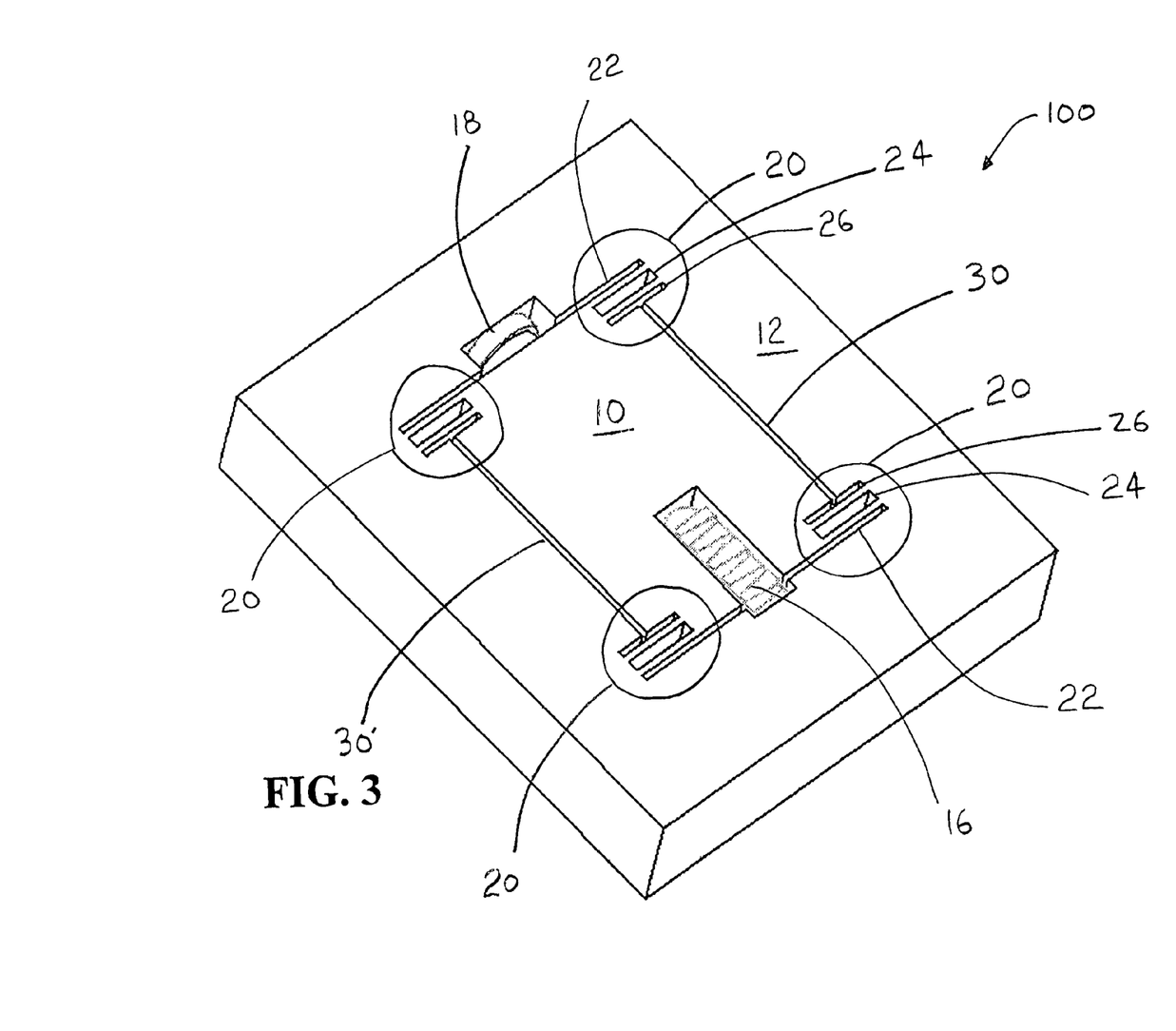
FIG. 3 is a perspective view of a first embodiment of a nanopositioner according to the present invention.

In a dual-parallel flexure mechanism of the type shown in FIG. 3, two identical flexures are arranged in parallel fashion at each corner of the platform. This arrangement doubles the stiffness of the flexure mechanism without increasing the stress on the flexures, thereby allowing loads greater than 1 kilogram in size to be manipulated.

As embodied and broadly described herein, the present invention is directed to a dual-parallel flexure design for nanopositioning stages for heavy-load applications as shown in FIG. 3. As described throughout the remainder of the disclosure, the present invention shall be described with reference to a one-axis-of-motion, single leaf-spring flexure design. This is for brevity alone. The invention described in the present application applies equally to multiple-axes-of-motion stages, and can be incorporated into other conventional flexure designs.

Figure 5:
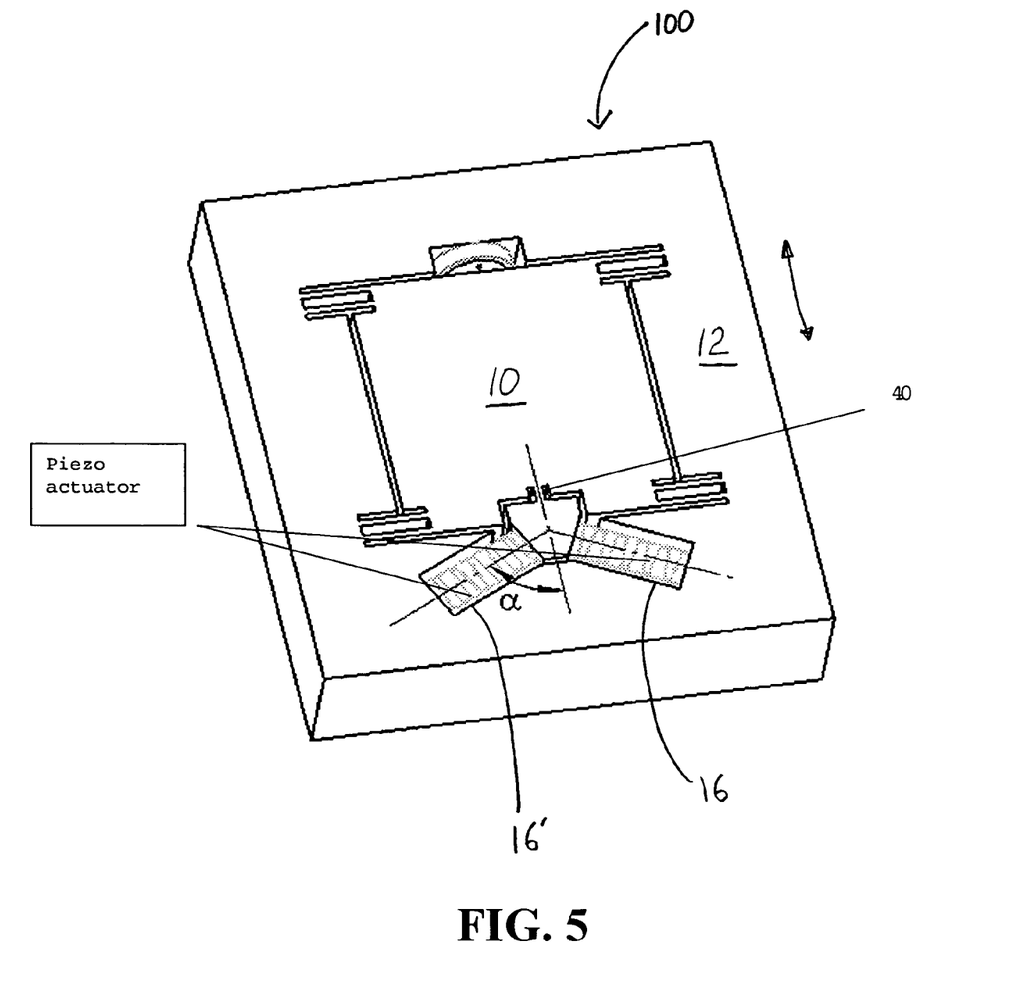
FIG. 5 is a perspective view of a second embodiment of a nanopositioner according to the present invention.

The inventive stage shown in FIG. 5 also includes additional features for increasing the range of the motion of the stage and the stiffness along the translation axis. Using dual actuators 16 and 16' doubles the stiffness of the actuator assembly. By tilting the orientation of the actuators (as shown in FIG. 5) the range of displacement generated by actuator can be amplified.

For small displacements, the amplification can be approximated as $$G = t \ g$$

The smaller the angle, the higher the amplification will be. However, the effective stiffness of the actuator along the translation axis is inversely proportional to the square of G. The force generated by the combined actuators 16 and 16' can only be transferred through the flexure 40 to the stage 10 in the translational axis (shown by the double-headed arrow to the right in FIG. 5). Any lateral forces generated by an individual actuator will be cancelled by the other actuator, or be decoupled from the stage 10 by the flexure 40.

Referring again to FIG. 3, which is the preferred embodiment of the invention, this figure depicts a single-axis, dual-parallel flexure nanopositioning stage 100 for heavy-load applications. The positioning device 100 comprises a movable stage 10, movably fixed within a frame 12, via a plurality of dual parallel flexures 20. Also depicted in FIG. 3 is an actuator 16 (which is preferably a piezoelectric actuator, although any actuator dimensioned and configured to move the stage 10 will suffice). Also depicted in FIG. 3 is a motion/position sensor 18 (preferably a capacitance sensor, although any sensor dimensioned and configured to sense the motion and/or position of the stage 10 will suffice).

The stage 10 and frame 12 are preferably machined from a unitary billet of material, such as aluminum, Invar, other metal alloys, or composite materials, such as those disclosed in U.S. Pat. No. 6,638,625, assigned to nPoint, Inc. (of Madison, Wis.), incorporated herein. Any material conventional used for flexure stages, or any suitable material developed in the future can be used to fabricate the nanopositioner of the present invention.

Each flexure 20 comprises a substantially rectangular void 24 disposed between a first substantially parallel void 22 and a second substantially parallel void 26. The two parallel voids 22 define two parallel edges of the stage 10. Two perpendicular voids 30 and 30' communicate with corresponding opposing voids 26 (along the axis of motion) to define the remaining two parallel edges of the stage 10.

When designing a flexure stage, the resonant frequency is always one of the key specifications, which determines the positioning or scanning speed and the stability of the system. The resonant frequency can be simply expressed as:

$$f_n = \frac{1}{2\pi} \sqrt{\frac{k}{m}} \quad (1)$$

where m is the mass of the platform and the added load, and k is the stiffness of the system. To increase the resonant frequency, either the mass has to be reduced or the stiffness has to be increased. Because the mass is load related, there is not much that can be done to alter the mass of the stage as a means to increase the resonance frequency; the mass will change depending upon the load placed upon the stage.

Therefore stiffness becomes the key parameter to be optimized in designing a flexure for improved performance under high loads.

As noted earlier, the flexure is normally designed so that it has a low stiffness in the axis of movement, and very high stiffness in all other axes to inhibit unwanted or "parasitic" off-axis motion. The stiffness of the stage system in the axis of motion is largely dominated by the stiffness of the actuator. (This is because in the axis of motion, the stage itself is optimized to move with as little resistance as possible.) In the other axes, stiffness is dominated by the inherent stiffness of flexures. For a normal load stage, a conventional single flexure design can generally keep the stiffness in the non-translation axes sufficiently high to maintain the resonant frequencies of the stage at a reasonable level, perhaps few kHz. However, for a heavy load, the stiffness of the stage has to be increased significantly to maintain the resonant frequencies at certain desirable level, perhaps a few hundred hertz. In short, a massive load brings with it an equally massive inertial moment. This causes the resonant frequencies in the non-translation axes to be very close to, or even lower than, the resonant frequency in the axis of translation. Thus, in the translation axis, the stiffness of the nanopositioner can be increased by using an actuator having a high stiffness. When using a piezoelectric actuator, the stiffness of piezoelectric crystal "stack" is proportional to its cross-section area and inversely proportional to its length. In the other non-translational axes, the stiffness can only be increased by increasing the stiffness of flexures. The flexure shown in FIG. 3 is such a flexure.

Figure 4:
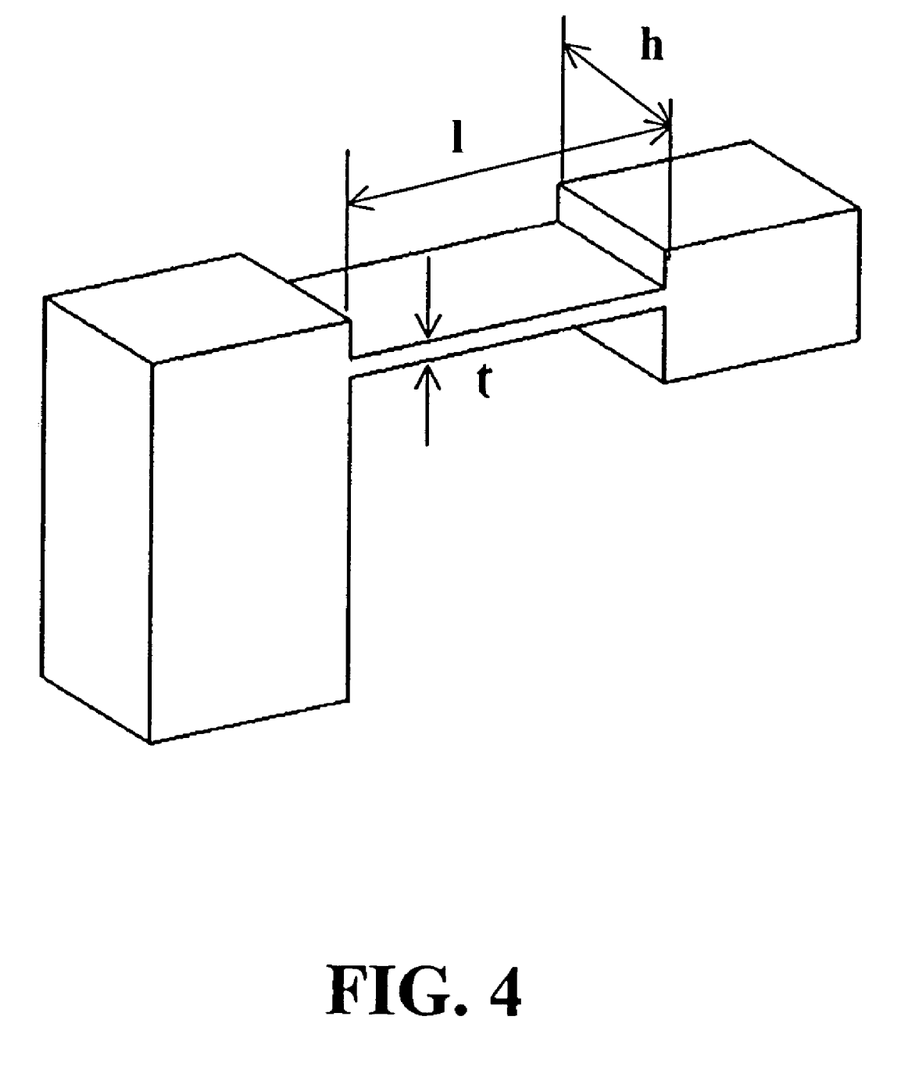
FIG. 4 is a perspective rendering of a flexure showing the dimensions that are used to calculate the stiffness of the flexure.

A conventional leaf-spring flexure can be used as an example to demonstrate why the present invention imparts increased stiffness to the flexures. The results discussed in the following paragraphs for leaf-spring flexures can be extended to notch flexures and compound flexures as well. The flexure stiffness is determined by three geometric parameters, length, l; thickness, t; and depth, h, as shown in FIG. 4. In general, the shorter, the thicker and the deeper the flexure is, the higher its stiffness will be. The relationship between the stiffness and the flexure parameters can be expressed as follows:

$$k \propto \frac{t^n h^m}{l^p} \quad (2)$$

where, k is the stiffness of the flexure, and the values of the exponents n, m and p depend upon the axis along which the stiffness is calculated. See, for example, S. T. Smith and D. G. Chetwynd, "Foundation of Ultraprecision Mechanism Design," Gordon and Breach Science Publishers, copyright 1992. The depth of the flexure is normally limited by the footprint of the stage body. Therefore, only the length and the thickness of the flexure can be optimized. The stress generated in the flexure when it is deflected is one of the main limitations for flexure design. The relationship between stress and flexure parameters can be expressed as:

$$\sigma \propto \frac{t^3 h}{l^2} \delta \quad (3)$$

where is the stress generated in the flexure, and is the deflection of the flexure (which equals the range of translation of the stage).

From equations 2 and 3, it can be seen that once the maximum allowable stress is determined, the stiffness of the flexure is fixed within a certain range. Thus, to increase the stiffness of the flexure mechanism, a dual-parallel flexure mechanism is designed as shown in FIG. 3. As shown in FIG. 3, two identical flexures are arranged in parallel at each corner of the platform. The arrangement doubles the stiffness of the flexure mechanism straight away, without increasing the stress in flexures. As a result, the resonant frequency can be approximately increased by a factor of 1.4 in all non-translational axes.

It is understood that the invention is not confined to the particular construction and arrangement of parts herein illustrated and described, but embraces such modified forms thereof as come within the scope of the claims

What is claimed is:

1. A positioning device comprising:
   a frame;
   a stage disposed within the frame, wherein the stage is dimensioned and configured to be translatable within the frame in at least one axis of motion; and
   at least one dual-parallel flexure attaching the stage to the frame, the dual-parallel flexure comprising two identical flexures arranged in parallel to each other.

2. The device of claim 1, further comprising at least one actuator operationally linked to the frame and the stage, wherein the actuator is dimensioned and configured to translate the stage within the at least one axis of motion.

3. The device of claim 2, wherein the at least one actuator is a piezoelectric actuator.

4. The device of claim 1, further comprising at least two actuators operationally linked to the frame and the stage, wherein the actuators are dimensioned and configured to translate the stage within the at least one axis of motion.

5. The device of claim 4, wherein the at least two actuators are piezoelectric actuators.

6. The device of claim 1, further comprising at least one sensor operationally linked to the frame and the stage, wherein the at least one sensor is dimensioned and configured to measure positioning of the stage within the frame.

7. The device of claim 6, further comprising at least one actuator operationally linked to the frame and the stage, wherein the actuator is dimensioned and configured to translate the stage within the at least one axis of motion.

8. The device of claim 7, wherein the at least one actuator is a piezoelectric actuator.

9. The device of claim 1, wherein the stage is substantially rectangular, and the at least one dual-parallel flexure is disposed at a corner of the stage.

10. The device of claim 9, comprising four dual-parallel flexures, wherein a dual-parallel flexure is disposed at each corner of the stage.

11. The device of claim 9, wherein each of the four dual-parallel flexures comprises a substantially rectangular void defined within the frame and disposed between a first substantially parallel void and a second substantially parallel void defined within the frame.

12. The device of claim 11, further comprising at least one sensor operationally linked to the frame and the stage, wherein the at least one sensor is dimensioned and configured to measure positioning of the stage within the frame.

13. The device of claim 12, further comprising at least one actuator operationally linked to the frame and the stage, wherein the actuator is dimensioned and configured to translate the stage within the at least one axis of motion.

14. The device of claim 13, wherein the at least one actuator is a piezoelectric actuator.

15. The device of claim 1, wherein the at least one dual-parallel flexure comprises a substantially rectangular void defined within the frame and disposed between a first substantially parallel void and a second substantially parallel void defined within the frame.

16. A positioning device comprising
   a frame;
   an integral stage defined within the frame, wherein the stage is dimensioned and configured to be translatable within the frame in at least one axis of motion;
   at least one dual-parallel flexure connecting the stage to the frame, the dual-parallel flexure comprising two identical flexures arranged in parallel to each other;
   at least one actuator operationally linked to the frame and the stage, wherein the actuator is dimensioned and configured to translate the stage within the at least one axis of motion; and
   a sensor dimensioned and configured to measure location of the stage within the frame.

17. The device of claim 16, wherein the at least one actuator is a piezoelectric actuator.

18. The device of claim 16, wherein the stage is substantially rectangular, and the at least one dual-parallel flexure is disposed at a corner of the stage.

19. A positioning device comprising
   a frame;
   a substantially rectangular, integral stage defined within the frame, wherein the stage is dimensioned and configured to be translatable within the frame in at least one axis of motion;
   four dual-parallel flexures connecting the stage to the frame, wherein a dual-parallel flexure is disposed at each corner of the stage;
   at least one piezoelectric actuator operationally linked to the frame and the stage, wherein the actuator is dimensioned and configured to translate the stage within the at least one axis of motion; and
   a sensor dimensioned and configured to measure location of the stage within the frame.

20. The device of claim 19, wherein the sensor is a capacitance sensor.

* * * * *